(12) United States Patent
Kuwabara et al.

(10) Patent No.: US 6,306,500 B1
(45) Date of Patent: Oct. 23, 2001

(54) POROUS OPTICAL FIBER BASE MATERIALS, OPTICAL FIBER BASE MATERIALS AND METHODS FOR PRODUCING THEM

(75) Inventors: Haruyoshi Kuwabara; Tadakatsu Shimada; Hideo Hirasawa, all of Gunma-ken (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 09/362,358

(22) Filed: Jul. 28, 1999

(30) Foreign Application Priority Data

| Jul. 29, 1998 | (JP) | 10-228689 |
| Jul. 29, 1998 | (JP) | 10-228690 |
| Jul. 29, 1998 | (JP) | 10-228691 |

(51) Int. Cl.$^7$ ................. D02G 3/00; B05D 5/06
(52) U.S. Cl. ............ 428/372; 428/375; 428/392; 65/414; 65/421; 65/422; 385/124; 427/163.2
(58) Field of Search ................ 385/124; 65/414, 65/421, 422; 428/375, 372, 392, 402; 427/163.2

(56) References Cited

FOREIGN PATENT DOCUMENTS

| 59-190-236 | 10/1984 | (EP) . |
| 61-026-527 | 2/1986 | (EP) . |
| 62-091-432 | 4/1987 | (EP) . |
| 63-025-243 | 2/1988 | (EP) . |
| 63-201-030 | 8/1988 | (EP) . |
| 01-009-821 | 1/1989 | (EP) . |
| 05-009-035 | 1/1993 | (EP) . |
| 07-172-860 | 7/1995 | (EP) . |
| 07-215-727 | 8/1995 | (EP) . |

Primary Examiner—Cynthia H. Kelly
Assistant Examiner—J. M. Gray
(74) Attorney, Agent, or Firm—Hogan & Hartson, L.L.P.

(57) ABSTRACT

There is disclosed a method for producing a porous optical fiber base material comprising depositing fine glass powder on a rotating member, wherein pore size of the deposited fine glass powder is controlled, and preferably, mode of the pore size is controlled to be 0.1 to 1 $\mu$m, or wherein a total amount of absorbed H2O amount and OH group amount on the fine glass powder per square meter of fine glass powder surface area is controlled to be $3.5 \times 10^{-5}$ to $7.5 \times 10^{-5}$ g. Such porous optical fiber base materials have an improved weight of fine glass powder deposited on the member per batch, or an improved fine glass powder deposit efficiency, which may greatly contribute to improvement of production ability and reduction of production cost. Further, there is disclosed a method for producing a porous optical fiber base material comprising depositing fine glass powder on a rotating member, wherein, as for the deposited fine glass powder, pore volume of pores having a pore size of 10 $\mu$m or more is controlled to be 1% by volume or less relative to the total pore volume. Such a porous optical fiber base material can markedly decrease air bubbles in an optical fiber base material after the fusion vitrification.

22 Claims, 3 Drawing Sheets

POROUS OPTICAL FIBER BASE MATERIALS, OPTICAL FIBER BASE MATERIALS AND METHODS FOR PRODUCING THEM

BACKGROUND OF THE INVENTION

1. Field of the Invention

The present invention relates to porous optical fiber base materials, optical fiber base materials and methods for producing them. In particular, the present invention relates to a porous optical fiber base material with improved weight of fine glass powder deposited on a member contained in the material, or improved fine glass powder deposit efficiency, and a porous optical fiber base material capable of affording a reduced number of air bubbles in a sintered body which is obtained by vitrifying deposited fine glass powder by fusion, and the present invention further relates to optical fiber base materials that can be obtained from the aforementioned porous base materials, and methods for producing them.

2. Description of the Related Art

A porous optical fiber base material has conventionally been produced by, for example, as in the outside chemical vapor deposition, depositing fine glass powder on a circumferential surface of axially rotating member of porous optical fiber base material.

In order to deposit the fine glass powder on the circumferential surface of the member, for example, the member is placed in an apparatus, called chamber, which covers the both ends of the member along its axial direction, and fine glass powder is produced around the member with flame formed from fuel gas and material gas thrown from a flame burner provided at a front part of the chamber so that the fine glass powder should be deposited on the member. The chamber is also provided with a mechanism for exhausting unreacted gases, gases generated from reactions, fine glass powder not deposited and the like from an exhaust port provided on the side opposite to the flame burner in the chamber.

A porous optical fiber base material produced by depositing fine glass powder on a member as described above has excellent purity and other-various excellent qualities. That is, in the field of the porous optical fiber base material production, marked progress has been achieved as for quality in recent years.

SUMMARY OF THE PRESENT INVENTION

The first object of the present invention is to further improve such a porous optical fiber base material having the various kinds of excellent qualities as described above, thereby obtaining a porous optical fiber base material with improved weight of fine glass powder deposited on the member per batch, or improved fine glass powder deposit efficiency, which may greatly contribute to improvement of production ability and reduction of production cost.

By the way, a conventional sintered body produced by vitrifying such a porous optical fiber base material as mentioned above by fusion (optical fiber base material) may internally contain bright spots. Such bright spots may remain even after the material is made into an optical fiber, and thus they may be a cause of light transmission loss. It is considered that the cause of the bright spots is exogenous contaminants or air bubbles contained in the material.

Therefore, the second object of the present invention is to further improve a conventional porous optical fiber base material to provide a porous optical fiber base material which can markedly decrease air bubbles in an optical fiber base material after the fusion vitrification, and an optical fiber base material substantially free from bright spots, which can be obtained from the porous optical fiber base material.

The inventors of the present invention earnestly conducted studies to achieve the first object of the present invention. As a result, it was found that, in order to increase the deposition weight of the fine glass powder on the member, without mentioning the enhancement of strength of the member, it is necessary to improve the strength of the deposited fine glass powder itself. That is, when the weight of the deposited fine glass powder is increased, the strength of the member can be enhanced by using a larger diameter. However, as for the deposited fine glass powder, if the deposition amount is simply increased, it inevitably causes its breakage during handling for the transfer to a subsequent step. That is, the deposited fine glass powder is transferred to the subsequent step by, for example, carrying it by a hand truck provided with a cushioning material. However, in spite of the use of the cushioning material, the bottom of the deposited fine glass powder may be broken of its own weight. Thus, the strength of the deposited fine glass powder itself should be required.

The present invention has been-accomplished in order to solve the above problem, and provides a porous optical fiber base material comprising a member on which fine glass powder is deposited, characterized in that the deposited fine glass powder has a controlled pore size.

By controlling the pore size of the deposited fine glass powder as in the aforementioned material, the strength of the deposited fine glass powder can be improved, and thus the weight of the deposited fine glass powder on the member can be increased.

In a preferred embodiment of the aforementioned porous optical fiber base material of the present invention, mode of the pore size of the deposited fine glass powder is controlled to be 0.1 to 1 $\mu$m.

A porous optical fiber base material whose pore size is controlled so that its mode should be in the above defined range can have, in particular, a long length and large diameter, i.e., it can have heavier deposited fine glass powder, and can be made into an optical fiber exhibiting excellent optical properties.

Further, during the earnest studies aiming at achieving the aforementioned first object, the inventors of the present invention found that there was correlation between deposit efficiency of the fine glass powder and physical properties of the deposited fine glass powder, in particular, a total amount of absorbed $H_2O$ amount and OH group amount on the fine glass powder per square meter of fine glass powder surface area, which is calculated based on specific surface area of the fine glass powder determined by the BET method.

That is, the present invention also provides a porous optical fiber base material comprising a member on which fine glass powder is deposited, characterized in that a total amount of absorbed $H_2O$ amount and OH group amount on the fine glass powder per square meter of fine glass powder surface area is $3.5 \times 10^{-5}$ to $7.5 \times 10^{-5}$ g.

If the total amount of absorbed $H_2O$ amount and OH group amount on the fine glass powder per square meter of the fine glass powder surface area is in the above-defined range, the porous optical fiber base material can have a high deposit efficiency of the fine glass powder to the center base material.

The present invention also provides an optical fiber base material which is obtained by vitrifying by fusion the aforementioned porous optical fiber base material having an increased weight of the deposited fine glass powder as a result of the control of the pore size, or the aforementioned porous optical fiber base material having an improved fine glass powder deposit efficiency.

By vitrifying by fusion the aforementioned porous optical fiber base material having an increased weight of the deposited fine glass powder as a result of the control of the pore size, an optical fiber base material having a long length and large diameter can be produced, and thus it can be made into an optical fiber exhibiting excellent optical properties.

Further, by using the aforementioned porous optical fiber base material having an improved fine glass powder deposit efficiency, a large-sized optical fiber base material having excellent optical characteristics can be produced at low cost.

The present invention also provides a method for producing a porous optical fiber base material comprising depositing fine glass powder on a rotating member, characterized in that pore size of the deposited fine glass powder is controlled.

By controlling the pore size of the deposited fine glass powder as in the aforementioned method, the strength of the deposited fine glass powder can be improved, and as a result, a porous optical fiber base material of a long length and large diameter, i.e., a porous optical fiber base material having a heavier weight of deposited fine glass powder can be produced.

In a preferred embodiment of the aforementioned method, mode of the pore size of the deposited fine glass powder is controlled to be 0.1 to 1 $\mu$m.

By controlling the mode of the pore size of the deposited fine glass powder to be 0.1 to 1 $\mu$m, in particular, an optical fiber base material having a long length and large diameter, i.e., a porous optical fiber base material having a heavier weight of deposited fine glass powder can be produced, and an optical fiber exhibiting excellent optical properties can be produced from the porous base material.

In another preferred embodiment of the aforementioned method, the pore size of the deposited fine glass powder is controlled by controlling flow rates of material gas for the fine glass powder and fuel gas.

As described above, the pore size of the deposited fine glass powder can be controlled, for example, by controlling flow rates of material gas for the fine glass powder and fuel gas.

The present invention also provides a method for producing a porous optical fiber base material comprising depositing fine glass powder on a rotating member, characterized in that a total amount of absorbed $H_2O$ amount and OH group amount on the fine glass powder per square meter of fine glass powder surface area is controlled to be $3.5 \times 10^{-5}$ to $7.5 \times 10^{-5}$ g.

By controlling the total amount of absorbed $H_2O$ amount and OH group amount on the fine glass powder per square meter of fine glass powder surface area to be within the above-defined range, the fine glass powder deposit efficiency can be improved, and thus the production cost of porous optical fiber base materials can be markedly reduced.

In a preferred embodiment of the aforementioned method, the total amount of absorbed $H_2O$ amount and OH group amount on the fine glass powder per square meter of fine glass powder surface area is controlled to be $3.5 \times 10^{-5}$ to $7.5 \times 10^{-5}$ g by controlling flow rates of gases supplied for depositing the fine glass powder.

The total amount of absorbed $H_2O$ amount and OH group amount on the fine glass powder per square meter of fine glass powder surface area can be controlled to be within the above-defined range by, specifically, controlling flow rates of gases supplied for depositing the fine glass powder as described above.

The present invention also provides a method for producing an optical fiber base material by vitrifying by fusion a porous optical fiber base material produced by any one of the methods mentioned above.

By using the porous optical fiber base material of the present invention, an optical fiber base material having a long length and large diameter can be produced, and an optical fiber exhibiting excellent optical properties can be produced from the base material in a large scale.

Further, according to the production methods of the present invention, porous optical fiber base materials can be produced at low cost. Accordingly, by using such porous optical fiber base materials, optical fiber base materials can also be produced at low cost. In addition, optical fiber base materials to be provided would have excellent optical characteristics.

The inventors of the present invention further investigated the structure of the deposited glass, in particular, pore distribution, in order to achieve the aforementioned second object, and found a correlation between the pore distribution in the porous base material and air bubbles in a sintered body.

Accordingly, the present invention further provides a porous optical fiber base material comprising a member on which fine glass powder is deposited, characterized in that, as for the deposited fine glass powder, pore volume of pores having a pore size of 10 $\mu$m or more is 1% by volume or less relative to the total pore volume.

If the deposited fine glass powder of a porous optical fiber base material has a pore volume of pores having a pore size of 10 $\mu$m or more of 1% by volume or less relative to the total pore volume, the number of air bubbles in a sintered body obtained from the porous optical fiber base material through vitrification by fusion can be markedly reduced.

The present invention also provides an optical fiber base material obtained by vitrifying the porous optical fiber base material mentioned above by fusion.

As described above, the porous optical fiber base material of the present invention has markedly fewer large pores having a pore size of 10 $\mu$m or more compared with conventional materials. Therefore, by using the porous optical fiber base material of the present invention, an optical fiber base material having a markedly small number of air bubbles can be produced. As a result, an optical fiber produced from this optical fiber base material has extremely few bright spots, and hence exhibits excellent optical characteristics, for example, it is substantially free from light transmission loss.

The present invention also provides a method for producing a porous optical fiber base material comprising depositing fine glass powder on a rotating member, characterized in that, as for the deposited fine glass powder, pore volume of pores having a pore size of 10 $\mu$m or more is controlled to be 1% by volume or less relative to the total pore volume.

By controlling the pore distribution in the deposited fine glass powder as in the aforementioned method, there can be produced a porous optical fiber base material that can reduce the number of air bubbles in a sintered body obtained by vitrification by fusion of the porous base material.

In a preferred embodiment of the method mentioned above, the pore volume of pores having a pore size of 10 $\mu$m or more in the deposited fine glass powder is controlled to be 1% by volume or less relative to the total pore volume by controlling revolution number of the member.

The pore distribution can be specifically controlled by controlling the revolution number of the member as described above.

The present invention still further provides a method for producing a porous optical fiber base material comprising depositing fine glass powder on a rotating member, characterized in that the revolution number of the member on which the fine glass powder is deposited is controlled during the deposition of the fine glass powder so that peripheral speed of the member should be 17 m/minute or more.

By controlling the revolution number of the rotating member so that the peripheral speed of the member should be, especially, 17 m/minute or more as described above, pores having a pore size of 10 $\mu$m or more in the deposited glass can surely be reduced.

The present invention further provides a method for producing an optical fiber base material by vitrifying by fusion a porous optical fiber base material produced by any one of the aforementioned production methods of the present invention.

As described above, the porous-optical fiber base material of the present invention has markedly fewer pores having a pore size of 10 $\mu$m or more compared with conventional materials. Therefore, by using the porous optical fiber base material of the present invention and vitrifying it by fusion, an optical fiber base material having a markedly small number of air bubbles can be produced. As a result, bright spots in the optical fiber base material are reduced, and then an optical fiber produced from this optical fiber base material also has extremely few bright spots, and exhibits excellent optical characteristics, i.e, it is substantially free from light transmission loss.

According to the present invention, a porous optical fiber base material of high soot strength can be produced. Therefore, the porous optical fiber base material can be one having a long length and large diameter, i.e., having a deposited soot of heavy weight. As a result, production ability can be improved and cost can be reduced in the production of porous optical fiber base materials.

According to the present invention, a porous optical fiber base material having fine glass powder deposited at a high deposit efficiency can also be obtained. Therefore, the fine glass powder material and the like can effectively used, and hence the production cost can be greatly reduced. In addition, an optical fiber base material obtained through sintering of the above porous base material substantially does not contain residual adsorbed $H_2O$ or OH groups. Therefore, an optical fiber produced from the above base material exhibits extremely low transmission loss and excellent optical characteristics, because it substantially does not suffer optical absorption, scattering loss and the like due to OH groups and the like.

According to the present invention, a porous optical fiber base material having a soot substantially free from pores having a pore size of 10 $\mu$m or more can further be produced. Therefore, an optical fiber base material obtained by sintering the above porous base material substantially does not contain bright spots (air bubbles). As a result, an optical fiber produced from the above optical fiber base material has extremely few bright spots, and hence exhibits excellent optical characteristics including substantially no light transmission loss.

DESCRIPTION OF THE INVENTION AND EMBODIMENTS

Embodiments of the present invention will be explained hereinafter with reference to the appended drawings, but the present invention is not limited to these.

The term "mode" used in the present invention means a representative value of the interval having the maximum frequency of occurrence in frequency distribution of the pore size of the deposited fine glass powder on the circumferential surface of member.

Figure 1:
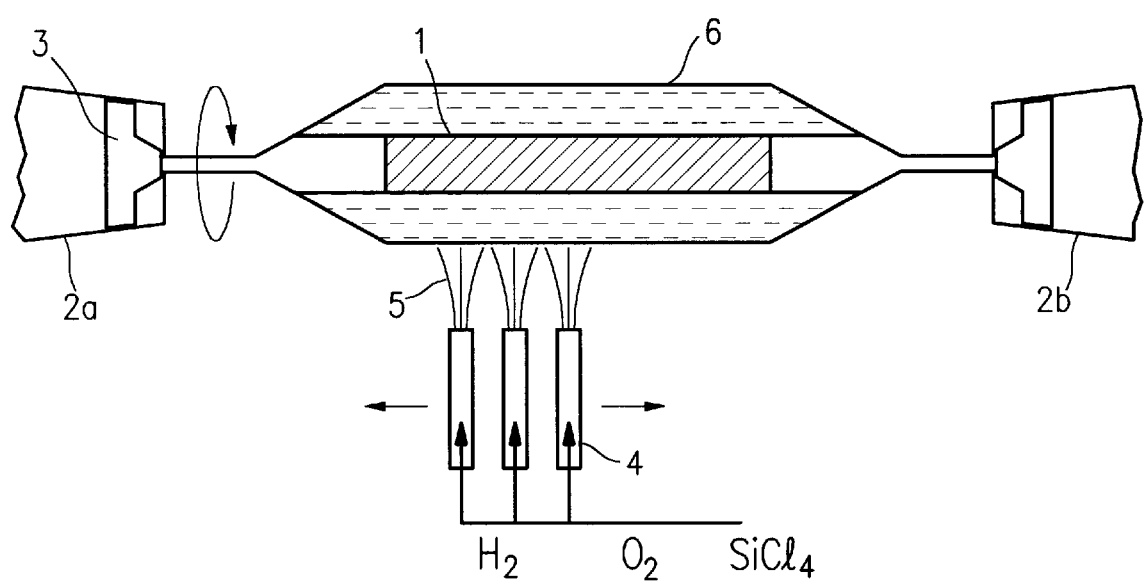
FIG. 1 shows a schematic enlarged partial view of a porous optical fiber base material production apparatus in an operation of depositing a soot on a target.
Figure 2:
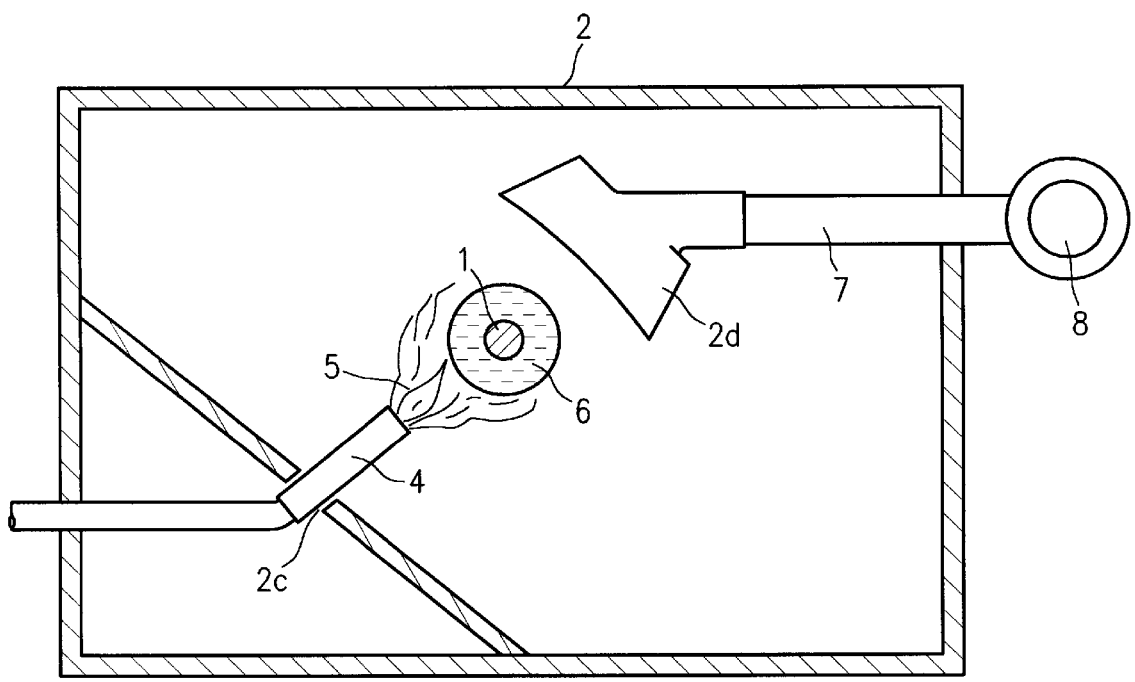
FIG. 2 shows a schematic view representing entire structure of a porous optical fiber base material production apparatus.

FIG. 1 shows the operation of depositing fine glass powder (the deposited glass is also referred to as "soot" hereinafter) on a member 1 of porous optical fiber base material (also referred to as a "target" hereinafter). In the porous optical fiber base material of the present invention, the fine glass powder 6 is deposited on the circumferential surface of the target 1 as shown in FIG. 2. The aforementioned target 1 is to be an optical fiber core, and specifically, it is composed of a quartz glass rod or the like.

According to one aspect of the present invention, there can be produced a porous optical fiber base material of a long length and large diameter, i.e., a porous optical fiber base material having the deposited fine glass powder 6 of a heavier weight. Accordingly, in order to support a base material of such a heavy weight, for example, as the target 1 to be used, one having a length of 200 mm or more and a diameter of 30 mm or more is used to secure its strength.

In the first embodiment of the porous optical fiber base material of the present invention, the fine glass powder 6 is deposited on the circumferential surface of such a target 1 whose strength is enhanced as mentioned above. The porous optical fiber base material of the present invention according to its first embodiment does not suffer breakage even when a heavy weight of soot is deposited. Specifically, the porous optical fiber base material of the present invention can be handled without suffering breakage even when, for example, 80 kg or more of the soot is deposited on the target.

The porous optical fiber base material of the present invention according to its first embodiment is characterized by the controlled pore size of the soot 6. The strength of the soot is improved by controlling the pore size of the soot. As a result, the soot of heavy weight can be deposited on the target without suffering breakage of the soot, and breakage of the soot during the later handling can also be avoided. The pore size of the soot 6 is preferably controlled so that its mode should be within 0.1–1 $\mu$m, particularly 0.2–0.6 $\mu$m. If the mode is less than 0.1 $\mu$m, when the porous optical fiber base material is subjected to fusion vitrification in an atmosphere of chlorine or the like in a subsequent step, OH groups on silica particle surfaces may not be removed due to insufficient diffusion of chlorine, and thus the OH groups may remain on the surfaces. When the mode exceeds 1 $\mu$m, the soot strength is degraded, and hence the soot may suffer breakage.

Figure 3:
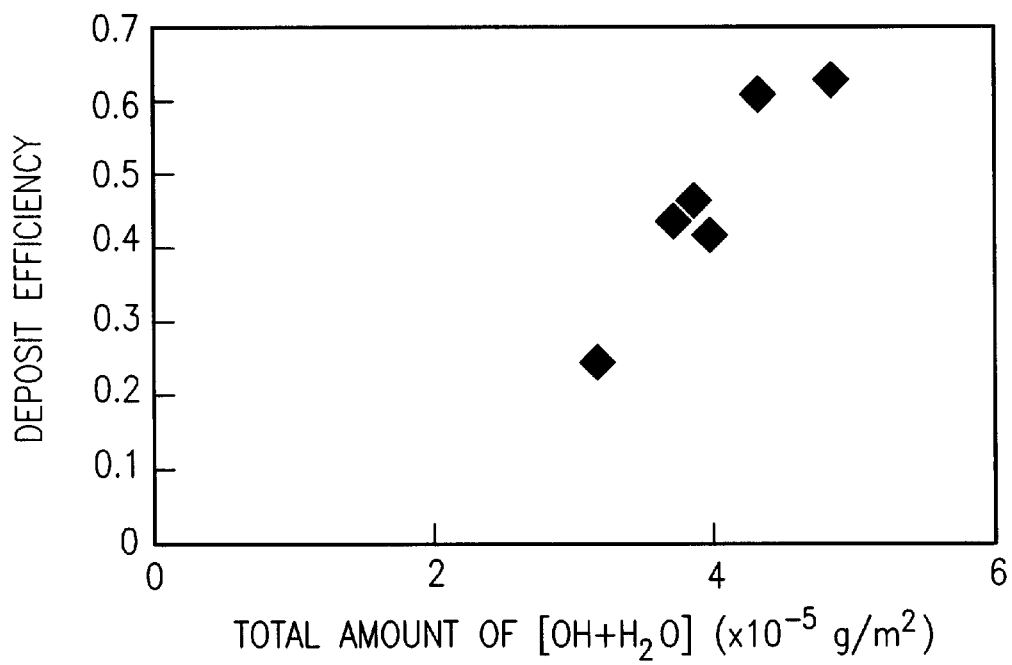
FIG. 3 is a graph representing a relationship between the total amount of absorbed $H_2O$ amount and OH group amount on fine glass powder per square meter of fine glass powder surface area and fine glass powder deposit efficiency.

The porous optical fiber base material of the present invention according to its second embodiment is characterized in that the fine glass powder 6 is deposited on the aforementioned target 1 at a high deposit efficiency. Such a high deposit efficiency can be achieved by providing a total amount of adsorbed $H_2O$ amount and OH group amount on the fine glass powder per square meter of fine glass powder surface area of $3.5 \times 10^{-5}$ or more. The relationship between the total amount of adsorbed $H_2O$ amount and OH group amount and the fine glass powder deposit efficiency is shown in FIG. 3. As seen from FIG. 3, when the aforementioned total amount is less than $3.5 \times 10^{-5}$g, the deposit efficiency of the fine glass powder becomes less than 0.4, and thus such an amount is not preferred. On the other hand, when the total amount exceeds $7.5 \times 10^{-5}$g, the deposit efficiency is sufficient, but the adsorbed $H_2O$ and OH groups may not sufficiently be eliminated during the dehydration step by chlorine when the porous optical fiber base material is sintered to afford an optical fiber base material, and thus OH groups may remain in the sintered body. Accordingly, an optical fiber produced from such a sintered optical fiber base material may contain residual OH groups, which cause optical absorption, scattering loss and the like, and hence promote transmission loss. Therefore, the aforementioned total volume is defined to be in the range of $3.5 \times 10^{-5}$ to $7.5 \times 10^{-5}$g, preferably $4 \times 10^{-5}$ to $7 \times 10^{-5}$ g.

The aforementioned "deposit efficiency" means a ratio of the amount of the fine glass powder deposited on the soot to the amount of the fine glass powder jetted to the target or the soot. The total amount of adsorbed $H_2O$ amount and OH group amount on the fine glass powder per square meter of fine glass powder surface area can be calculated, for example, as follows.

That is, surface area of the fine glass powder per unit weight, i.e., specific surface area, is determined by the BET method or the like. On the other hand, total amount of adsorbed $H_2O$ and OH groups present on surfaces of the fine glass powder per unit weight is determined by a suitable analytic means, for example, the Grignard method or the like. If necessary, only the absorbed $H_2O$ amount may be further determined by the Karl Fischer method or the like. This also affords the remaining OH group amount within the aforementioned total amount. From the above specific surface area and the total amount, the total amount of absorbed $H_2O$ amount and OH group amount on the fine glass powder per square meter of fine glass powder surface area can be obtained.

As described above, there is observed a positive correlation between the total amount of absorbed $H_2O$ amount and OH group amount on the fine glass powder per square meter of fine glass powder surface area and the fine glass powder deposit efficiency. While the mechanism for deposition of the fine glass powder to the soot representing such a correlation is indefinite, it is considered that OH groups of the Si—OH bonds in the fine glass powder, which are formed through hydrolysis in oxyhydrogen flame, are linked to OH groups of the Si—OH bonds in the soot by dehydration condensation to form Si—O—Si bonds, and thus the fine glass powder and the soot are bonded, resulting the deposition of the fine glass powder. At this chance, the adsorbed $H_2O$ also variously reacts with the fine glass powders according to the following formulae, and may be a cause of the bonding partner OH group formation in the fine glass powder. Therefore, the adsorbed $H_2O$ also increases the deposit efficiency.

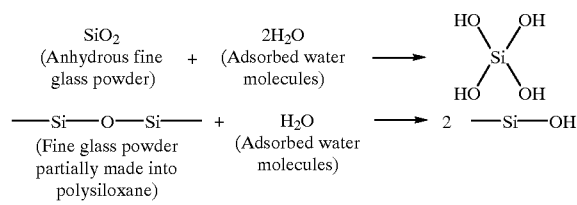

The porous optical fiber base material of the present invention according to its third embodiment, which achieves the aforementioned second object of the present invention, is characterized in that the pore distribution of the soot 6 is controlled. By controlling the pore distribution of the soot, the number of air bubbles in the sintered body obtained after the vitrification by fusion of the soot can be reduced, and as a result, an optical fiber free from bright spots can be produced. The pore distribution of the soot 6 is controlled so that pore volume of pores having a pore size of 10 μm or more should be 1% by volume or less relative to the total-pore volume. Preferably, the pore volume of pores having a pore size of 10 μm or more is 0.5% by volume or less relative to the total pore volume. In particular, the pores usually have a size of around 0.4 μm, and it is more preferred that there is no large pore having a pore size of 10 μm or more, because pores having a pore size of less than 10 μm can be eliminated during the sintering.

One of the optical fiber base materials of the present invention is obtained through fusion vitrification of the aforementioned porous optical fiber base material of the present invention according to its first embodiment. By using the aforementioned porous optical fiber base material of the present invention according to its first embodiment, which can have an increased weight of deposited fine glass powder as a result of the controlled pore size, an optical fiber base material of a long length and large diameter can be obtained. In addition, an optical fiber obtained from this base material does not contain residual OH groups and the like, and hence it exhibits markedly low transmission loss, because it substantially does not suffer optical absorption, scattering loss and the like.

Another optical fiber base material of the present invention is obtained through fusion vitrification of the aforementioned porous optical fiber base material of the present invention according to its second embodiment. By using the aforementioned porous optical fiber base material of the present invention according to its second embodiment with excellent deposit efficiency of the fine glass powder, a large-sized optical fiber base material having excellent optical characteristics can be produced at low cost. Furthermore, an optical fiber obtained from this base material does not contain residual OH groups and the like, and hence it exhibits markedly low transmission loss, because it substantially does not suffer optical absorption, scattering loss and the like.

Another optical fiber base material of the present invention is obtained through fusion vitrification of the aforementioned porous optical fiber base material of the present invention according to its third embodiment. By using the aforementioned porous optical fiber base material of the present invention according to its third embodiment, an optical fiber base material substantially free from air bubbles, i.e., bright spots, can be obtained. Furthermore, an optical fiber obtained from this base material contains extremely few bright spots, and has excellent optical characteristics including substantially no light transmission loss.

In the methods for producing a porous optical fiber base material of the present invention, the soot is deposited on the circumferential surface of the target while the target is rotated. By rotating the target 1, the soot 6 can be deposited uniformly. While the revolution speed may be optionally selected, it may be, for example, 10–50 rpm. In FIGS. 1 and 2, the target 1 is rotatably accommodated in a chamber 2, and the both ends of the target are held by chucks 3 or the like. Flame 5 thrown from flame burners 4 is applied to the circumferential surface of the rotating target 1 by reciprocating the burners 4 at a constant speed. As a result, the fine glass powder 6 (soot) is uniformly deposited on the circumferential surface of the target 1.

Material gas for the soot (for example, a silicon compound such as $SiCl_4$) and fuel gas (for example, $H_2$, $O_2$ and the like) are supplied from the aforementioned flame burners 4. The material gas is hydrolyzed in the oxyhydrogen flame to form fine glass powder, and the formed fine glass powder is jetted to the circumferential surface of the target 1, and deposited on it.

As for the position of the target 1, the apparatus may employ various structures wherein the target may be placed vertically or horizontally.

As seen from the schematic view of the whole structure of the apparatus for producing porous optical fiber base material shown in FIG. 2, the aforementioned chamber 2 usually has a chuck cover 2a covering one end of the target 1, and a chuck cover 2b covering the other end of the target 1. The flame burners 4 are reciprocated in an opening 2c of the chamber 2 along the direction parallel to the axial direction of the member. On the other hand, for example, a plurality of exhaust ports 2d (one exhaust port may also be possible) for exhausting unreacted gases, gases generated in reactions, fine glass powder not deposited and the like are provided on the rear side (right in the drawing) of the chamber 2. The exhaust ports 2d are connected to exhaust pipe 7, and the atmosphere in the chamber is exhausted by aspiration by means of an exhausting means 8, for example, a suction pump, provided, for example, in the middle of the exhaust pipe 7 at a predetermined suction power (exhaust suction force)

The first embodiment of the method for producing a porous optical fiber base material according to the present invention is characterized in that the pore size of the deposited fine glass powder is controlled. The pore size is preferably controlled so that its mode should be 0.1 to 1 $\mu$m, particularly preferably 0.2 to 0.6 $\mu$m as described above.

Specifically, the aforementioned control of the pore size is performed by controlling flow rates of the material gas for the fine glass powder and fuel gas supplied from the aforementioned flame burners 4. That is, the pore size can be controlled by controlling flow rates of hydrogen gas and oxygen gas contained in the fuel gas, which corresponds to the combustion energy considered to be directly related to the aforementioned pore size, relative to the flow rate of the material gas. For example, when the flow rate of the fuel gas relative to that of the material gas is increased, i.e., when the flow rates of hydrogen gas and oxygen gas are increased, the pore size becomes small. Conversely, when the flow rate of the fuel gas relative to that of the material gas is decreased, the pore size becomes large.

For example, when the flow rate of $SiCl_4$ material gas is 10–30 L/minute, the flow rates of hydrogen gas and oxygen gas in the fuel gas may be 100–600 L/minute and 100–300 L/minute, respectively.

Further, the pore size can further be controlled by controlling the revolution number of the target and the like.

The second embodiment of the method for producing a porous optical fiber base material according to the present invention is characterized in that the total amount of absorbed $H_2O$ amount and OH group amount on the fine glass powder per square meter of fine glass powder surface area is controlled to be $3.5 \times 10^{-5}$ to $7.5 \times 10^{-5}$ g, preferably $4 \times 10^{-5}$ to $7 \times 10^{-5}$ g. As described above, by controlling the total amount to be within the above-defined range, the fine glass powder deposit efficiency to the target circumferential surface can be improved, and therefore porous optical fiber base materials can be produced at low cost. Furthermore, an optical fiber base material obtained from this porous base material substantially does not contain residual OH groups and the like, and hence it exhibits excellent optical characteristics.

The total amount of the absorbed $H_2O$ amount and the OH group amount can be controlled, for example, by controlling flow rates of the gases supplied for depositing the fine glass powder. Specifically, the control is preferably achieved by controlling the flow rate of the fuel gas (for example, $H_2$, $O_2$, and the like) relative to that of the material gas for the soot (for example, a silicon compound such as $SiCl_4$). That is, when the flow rate of fuel gas is reduced relative to that of the material gas, combustion energy becomes smaller, which affords larger specific surface area, and thus the total amount of the absorbed $H_2O$ amount and the OH group amount per unit area becomes smaller. As a result, the deposit efficiency is decreased. Conversely, when the flow rate of the fuel gas is made larger relative to that of the material gas, combustion energy becomes larger, which affords smaller specific surface area, and thus the total amount of the absorbed $H_2O$ amount and the OH group amount per unit area becomes larger. As a result, the deposit efficiency is increased. However, if the flow rate of the fuel gas is made unduly large, OH groups and the like then remain during the sintering of the porous optical fiber base material, and a whitely fogged sintered body may disadvantageously be afforded.

Specifically, when the flow rate of $SiCl_4$ material gas is 5–30 L/minute, for example, the flow rates of hydrogen gas and oxygen gas in the fuel gas may be 150–600 L/minute and 50–300 L/minute, respectively.

In addition, the fine glass powder deposit efficiency can further be controlled by controlling the revolution number of the target and the like.

According to the methods for producing an optical fiber base material of the present invention, the optical fiber base materials are produced by vitrifying the aforementioned porous optical fiber base materials of the present invention by fusion. Specifically, the optical fiber base materials of the present invention are obtained by, for example, heating the aforementioned porous optical fiber base materials to a temperature of 1300–1700° C. in an electric furnace or the like, if necessary, with dehydration by chlorine gas or the like.

Then, the optical fiber base material of the present invention obtained as described above can be made into an optical fiber by a conventional method, for example, fusion stretching or the Like. The optical fiber produced as described above does not contain residual OH groups and the like, and hence it exhibits markedly low transmission loss, because it substantially does not suffer optical absorption, scattering loss and the like due to the OH group.

The third embodiment of the method for producing a porous optical fiber base material according to the present invention is characterized in that, as for the soot, the pore volume of pores having a large pore size of 10 μm or more is controlled to be 1% by volume or less, preferably 0.5% by volume or less, relative to the total pore volume. Specifically, the above control of the pore size is achieved by controlling the revolution number of the member.

In the aforementioned production of the porous optical fiber base material, fine glass powder particles of various sizes are formed depending on the production conditions including the revolution number of the target, and deposit on the target. Accordingly, it is thought that the microstructures of the soot which may be the cause of the bright spots (air bubbles) after the sintering are formed in this stage. On the other hand, a constant revolution speed of the target has conventionally been employed irrespective of the outer diameter of the target, and therefore the peripheral speed becomes faster as the diameter becomes larger.

Therefore, the inventors of the present invention conducted following studies in order to examine the structures of the soot in the porous base material along the radial direction, in particular, its pore distribution, and to elucidate microstructures that cause the bright spots (air bubbles) based on abnormalities of the structures, thereby developing a method for reducing the bright spots (air bubbles).

Figure 4:
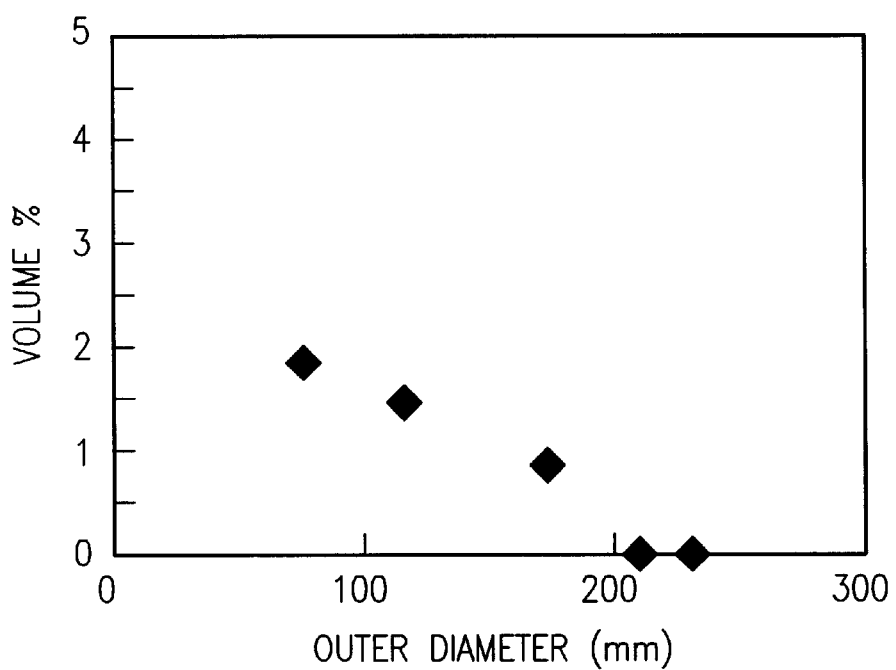
FIG. 4 is a graph representing a relationship between soot outer diameter and volumetric fraction of pores having a diameter of not less than 10 $\mu$m.

FIG. 4 represents variation of the ratio of the pore volume of pores having a pore size of 10 μm or more relative to the total pore volume in the soot 6 in relation to the position along the radial direction when the soot was deposited at a constant revolution number of the target 1, 30 rpm. As seen from FIG. 4, the pore volume of pores having a pore size of 10 μm or more becomes smaller as the outer diameter of the soot becomes larger. That is, it can be understood that the pore volume ratio of pores having a pore size of 10 μm or more in the deposited soot becomes smaller as the peripheral speed becomes larger.

Therefore, by controlling the peripheral speed through control of the revolution number of the target, the pore volume ratio of pores having a pore size of 10 μm or more in the soot can be controlled. As a result, the number of air bubbles in the soot after sintering can be decreased. As described above, the revolution number of the target is preferably controlled so that the pore volume of pores having a pore size of 10 μm or more should be 1% by volume or less relative to the total pore volume in the soot.

Specifically, as seen from FIG. 4, when a soot is deposited on a target at the revolution speed of 30 rpm to produce a porous base material, if an outer diameter of the base material exceeds about 180 mm, namely the peripheral speed of the target is 17 m/minute or more, 17 m/min is calculated from the below:

180(mm)×π×30(rpm)=16956 mm/minute

≈17 m/min, the pore volume ratio of pores having a pore size of 10 μm or more can be 1% by volume or less of the total pore volume in the soot (deposited glass).

In particular, because the target has conventionally been rotated at a constant revolution speed irrespective of the outer diameter of the target, a portion of the soot deposited in an early stage of the deposition at a low periphery speed has contained many pores having a pore size of 10 μm or more. Such pores are difficult to be eliminated even by the sintering. However, by controlling the revolution number of the target, according to the third embodiment of the production method of the present invention, so that the peripheral speed of the target should be, for example, 17 m/minute or more from the start of the deposition of the soot, pores having a pore size of 10 μm or more can be markedly reduced even in a portion of the soot deposited in an early stage of the deposition.

As a result, an optical fiber base material and optical fiber substantially free from the bright spots can be produced.

The reason why the ratio of pores having a pore size of 10 μm or more becomes smaller with increase of peripheral speed is not clear. However, it is considered that the peripheral speed of the soot relates to the phenomenon. That is, it is considered that, upon deposition of glass microparticles, a lower peripheral speed leads to a larger number of the particles stacking along the radial direction, and longer length of chaplets of such stacked particles, and thus pores of a large pore size should be formed. This is supported by the fact that linearly linked glass microparticles were observed in SEM photograph though it is not appended to the present specification.

In addition, the pore size distribution can further be controlled by controlling the flow rates of the material gas, fuel gas and the like as described above.

According to the aforementioned method for producing an optical fiber base material of the present invention, the optical fiber base material is produced by vitrifying by fusion the aforementioned porous optical fiber base material of the present invention according to its third embodiment as-described above. Specifically, the optical fiber base material of the present invention is obtained by, for example, heating the aforementioned porous optical fiber base material having few pores having a pore size of 10 μm or more to a temperature of 1300–1700° C. in an electric furnace or the like, if necessary, with dehydration by chlorine gas or the like.

Then, the optical fiber base material of the present invention obtained as described above can be made into an optical fiber by a conventional method, for example, fusion stretching and the like as mentioned above. The optical fiber produced as described above contains extremely few bright spots, and exhibits excellent optical characteristics including substantially no light transmission loss.

EXAMPLES

The present invention will be specifically explained hereinafter with reference to the following examples.

Examples 1–3 and Comparative Examples 1 and 2

Porous optical fiber base materials were produced by using such a production apparatus as shown in FIGS. 1 and 2 as follows. A target 1 having a diameter of 40 mm was mounted in a chamber 2, and a soot 6 was deposited at a constant revolution number of 30 rpm under the conditions shown in Table 1. As for gas introduction, a material, $SiCl_4$, and fuels, $H_2$ and $O_2$, were thrown from flame burners 4. After the hydrolysis of the material, $SiO_2$ was made into fine glass powder, and the soot 6 was deposited until a soot weight of 70–80 kg was obtained.

Mode of the pore size, presence or absence of breakage of soot, and residual amount of OH groups after chlorine treatment are shown in Table 1 for each obtained porous optical fiber base material.

The pore size was determined for a 1 cm cube block cut out from each soot by a mercury penetration porosimeter.

TABLE 1

| Example No. | SiCl$_4$ (L/min) | H$_2$ (L/min) | O$_2$ (L/min) | Pore size mode ($\mu$) | Residual OH groups (ppm) | Breakage of soot |
|---|---|---|---|---|---|---|
| Example 1 | 14.2 | 186 | 105 | 0.41 | <0.01 | Absent |
| Example 2 | 25.6 | 287 | 148 | 0.43 | <0.01 | Absent |
| Example 3 | 22.6 | 539 | 252 | 0.39 | <0.01 | Absent |
| Comparative Example 1 | 5.0 | 955 | 350 | 0.08 | 15 | Absent |
| Comparative Example 2 | 12.0 | 60 | 30 | 1.30 | <0.01 | Observed |

As seen from the results shown in Table 1, when a larger flow rate of the fuel gas is used relative to that of the material gas, the pore size mode becomes smaller, and as a result the residual OH group amount becomes larger. Conversely, when a smaller flow rate of the fuel gas is used relative to that of the material gas, the pore size mode becomes larger, and as a result the soot begins to cause breakage.

Examples 4–6 and Comparative Examples 3 and 4

Porous optical fiber base materials were produced by using such a production apparatus as shown in FIGS. 1 and 2 as follows. A target 1 having a diameter of 40 mm and composed of a quartz glass rod was mounted in a chamber 2, and a soot 6 was deposited at a constant revolution number of 30 rpm under the conditions shown in Table 2. As for the gas introduction, a material, SiCl$_4$, and fuels, H$_2$ and O$_2$, were thrown from flame burners 4. After the hydrolysis of the material in oxyhydrogen flame, SiO$_2$ was made into fine glass powder, and the soot 6 was deposited.

A part of the soot 6 of each obtained porous optical fiber base material was crumbed into powder by rubbing it by hand, and used as a sample. The total amount of the absorbed H$_2$O amount and the OH group amount of each sample was determined by the Grignard method, and specific surface area of each sample was also determined by the BET method. From the total amount and the specific surface area obtained above, the total amount of the absorbed H$_2$O amount and the OH group amount per square meter of the fine glass powder surface area was obtained. Further, each sample was sintered at 1500° C. for 5 hours under chlorine atmosphere to obtain a soot sintered body. Appearance of the obtained sintered body was visually inspected. Deposit efficiency was obtained as a ratio of molar amount of the deposited SiO$_2$ to molar amount of the supplied SiCl$_4$. The above deposit efficiency, BET specific surface area, concentration and weight per unit area of the total amount of adsorbed H$_2$O amount and the OH group amount, and appearance of sintered body for each sample are shown in Table 2.

TABLE 2

| Example No. | SiCl$_4$ (L/min) | H$_2$ (L/min) | O$_2$ (L/min) | Deposit efficiency | BET (m$^2$/g) | [OH + H$_2$O] (ppm) | [OH + H$_2$O] (×10$^{-5}$ g/m$^2$) | Appearance after sintering |
|---|---|---|---|---|---|---|---|---|
| Example 4 | 7.8 | 169 | 93 | 0.46 | 6.7 | 260 | 3.9 | Clear |
| Example 5 | 25.6 | 287 | 148 | 0.43 | 9.4 | 370 | 3.9 | Clear |
| Example 6 | 22.6 | 539 | 252 | 0.62 | 10.7 | 410 | 4.5 | Clear |
| Comparative Example 3 | 5.5 | 420 | 222 | 0.59 | 8.2 | 860 | 10.4 | Whitely fogged |
| Comparative Example 4 | 24.3 | 230 | 102 | 0.23 | 20.4 | 550 | 2.7 | Clear |

As seen from the results shown in Table 2, as the flow rate of the fuel gas (H$_2$+O$_2$) is increased relative to that of the material gas SiCl$_4$, the deposit efficiency of the fine glass powder becomes higher. However, if the flow rate of the fuel gas becomes unduly large relative to that of the SiCl$_4$ material gas, the sintered body begins to be whitely fogged (Comparative Example 3).

Examples 7–9 and Comparative Examples 5 and 6

Porous optical fiber base materials were produced by using such a production apparatus as shown in FIGS. 1 and 2 as follows. A target 1 having a diameter of 40 mm was mounted in a chamber 2, and a soot 6 was deposited at a revolution number of 30 rpm for a soot outer diameter of 200 mm or more, or a revolution number shown in Table 3 for a soot outer diameter of less than 200 mm under the conditions shown in Table 3. As for the introduced gases, a material, SiCl$_4$, and fuels, H$_2$ and O$_2$, were thrown from flame burners 4. After the hydrolysis of the material in oxyhydrogen flame, SiO$_2$ was made into fine glass powder, and the soot was deposited until a soot weight of 70–80 kg was obtained.

Ratio of pore volume of pores having a pore size of 10 $\mu$m or more relative to the total pore volume (% by volume) in pore distribution was determined for a part of the soot 6 of each obtained porous optical fiber base material. Each remained part was vitrified by fusion at 1500° C. for 5 hours under chlorine atmosphere to form a soot sintered body, and number of bright spots (air bubbles) in the soot sintered body was determined.

The pore size was determined for a 1 cm cube block cut out from each soot by a mercury penetration porosimeter. The number of bright spots (air bubbles) was visually counted by lighting the soot sintered body in a darkroom.

TABLE 3

| Example No. | SiCl$_4$ (L/min) | H$_2$ (L/min) | O$_2$ (L/min) | Revolution speed (1) | Volume % of pores (2) | Bright spots (3) |
|---|---|---|---|---|---|---|
| Example 7 | 14.2 | 186 | 105 | 80 | 0.5 | 2 |
| Example 8 | 25.6 | 287 | 148 | 120 | 0.1 | 1 |
| Example 9 | 22.6 | 539 | 252 | 100 | 0.3 | 3 |
| Comparative Example 5 | 22.6 | 540 | 251 | 30 | 1.5 | 15 |
| Comparative Example 6 | 23.0 | 541 | 251 | 5 | 4.4 | 120 |

(1) Revolution speed for diameter of 200 nm or less (rpm)
(2) Volume % of pores of 10 μ or more in soot
(3) Number of bright spots (air bubbles) after sintering As seen from the results shown in Table 3, as the revolution speed of the target becomes faster, the ratio of pore volume of pores having a pore size of 10 μm or more is reduced, and simultaneously the number of the bright spots in the soot is markedly reduced.

The present invention is not limited to the embodiments described above. The above-described embodiments are mere examples, and those having the substantially same structure as that described in the appended claims and providing the similar functions and advantages are included in the scope of the present invention.

What is claimed is:

1. A porous optical fiber base material comprising fine glass powder deposited on a circumferential surface of a target to be an optical fiber core, wherein the deposited glass has a controlled pore size distribution.

2. The porous optical fiber base material according to claim 1, wherein mode of the pore size of the deposited glass is controlled to be 0.1 to 1 μm.

3. A porous optical fiber base material comprising fine glass powder deposited on a circumferential surface of a target to be an optical fiber core, wherein a total amount of absorbed H$_2$O amount and OH group amount on the fine glass powder per square meter of fine glass powder surface area is $3.5\times10^{-5}$ to $7.5\times10^{-5}$ g.

4. An optical fiber base material, which is obtained by vitrifying a porous optical fiber base material according to any one of claims 1–3 by fusion.

5. A method for producing a porous optical fiber base material comprising depositing fine glass powder on a rotating target to be an optical fiber core, wherein pore size distribution of the deposited glass is controlled.

6. The method for producing a porous optical fiber base material according to claim 5, wherein mode of the pore size of the deposited glass is controlled to be 0.1 to 1 μm.

7. A method for producing an optical fiber base material, wherein the optical fiber base material is produced by vitrifying a porous optical fiber base material produced by a method according to claim 6 by fusion.

8. The method for producing a porous optical fiber base material according to claim 5 or 6, wherein the pore size distribution of the deposited glass is controlled by controlling flow rates of material gas for the fine glass powder and fuel gas.

9. A method for producing an optical fiber base material, wherein the optical fiber base material is produced by vitrifying a porous optical fiber base material produced by a method according to claim 8 by fusion.

10. The method for producing a porous optical fiber base material according to claim 8, wherein the flow rate of the material gas is controlled to be 10–30 L/min, and the flow rates of hydrogen gas and oxygen gas in the fuel gas are controlled to be 100–600 L/min and 100–300 L/min, respectively.

11. A method for producing an optical fiber base material, wherein the optical fiber base material is produced by vitrifying a porous optical fiber base material produced by a method according to claim 5 by fusion.

12. A method for producing a porous optical fiber base material comprising depositing fine glass powder on a rotating target to be an optical fiber core, wherein a total amount of absorbed H$_2$O amount and OH group amount on the fine glass powder per square meter of fine glass powder surface area is controlled to be $3.5\times10^{-5}$ to $7.5\times10^{-5}$ g.

13. A method for producing an optical fiber base material, wherein the optical fiber base material is produced by vitrifying a porous optical fiber base material produced by a method according to claim 12 by fusion.

14. The method for producing a porous optical fiber base material according to claim 12, wherein the total amount of absorbed H$_2$O amount and OH group amount on the fine glass powder per square meter of fine glass powder surface area is controlled to be $3.5\times10^{-5}$ to $7.5\times10^{-5}$ g by controlling flow rates of gases supplied for depositing the fine glass powder.

15. A method for producing an optical fiber base material, wherein the optical fiber base material is produced by vitrifying a porous optical fiber base material produced by a method according to claim 14 by fusion.

16. The method for producing a porous optical fiber base material according to claim 14, wherein, as the gas is supplied for depositing the fine glass powder, the flow rate or material gas is controlled to be 5–30 L/min, and the flow rates of hydrogen gas and oxygen gas in fuel gas controlled to be 150–600 L/min and 50–300 L/min, respectively.

17. A porous optical fiber base material comprising a fine glass powder deposited on a circumferential surface of a target to be an optical fiber core, wherein pore volume ratio of pores having a pore size of 10 μm or more in the deposited glass is 1% by volume or less of the total pore volume.

18. An optical fiber base material, which is obtained by vitrifying the porous optical fiber base material according to claim 17 by fusion.

19. A method for producing a porous optical fiber base material comprising depositing fine glass powder on a rotating target to be an optical fiber core, wherein pore volume ratio of pores having a pore size of 10 μm or more in the deposited glass is controlled to be 1% by volume or less of the total pore volume.

20. The method for producing a porous optical fiber base material according to claim 19, wherein the pore volume ratio of pores having a pore size of 10 μm or more in the deposited glass is controlled to be 1% by volume or less of the total pore volume by controlling revolution number of the target.

21. A method for producing a porous optical fiber base material comprising depositing fine glass powder on a rotating target to be an optical fiber core, wherein the revolution number of the target is controlled during the deposition of the fine glass powder so that peripheral speed of the target should be 17 m/minute or more.

22. A method for producing an optical fiber base material, wherein the optical fiber base material is produced by vitrifying a porous optical fiber base material produced by a method according to any one of claims 19–21 by fusion.

* * * * *